Nov. 10, 1970 C. D. BOLTZ, JR 3,539,920
CIRCUIT FOR DETERMINING WHICH OF TWO REPETITIVE PULSE SIGNALS HAS THE HIGHEST FREQUENCY

Filed March 22, 1968 — 2 Sheets-Sheet 1

INVENTOR.
CHARLES D. BOLTZ, JR.
BY
*Hugh L. Fisher*
ATTORNEY

Nov. 10, 1970

C. D. BOLTZ, JR 3,539,920

CIRCUIT FOR DETERMINING WHICH OF TWO REPETITIVE PULSE SIGNALS
HAS THE HIGHEST FREQUENCY

Filed March 22, 1968

INVENTOR.
CHARLES D. BOLTZ, JR.

BY

Hugh L. Fisher

ATTORNEY

United States Patent Office 3,539,920
Patented Nov. 10, 1970

1

3,539,920
CIRCUIT FOR DETERMINING WHICH OF TWO REPETITIVE PULSE SIGNALS HAS THE HIGHEST FREQUENCY
Charles D. Boltz, Jr., Greenwood, Ind., assignor to General Motors Corporation, Detroit, Mich., a corporation of Delaware
Filed Mar. 22, 1968, Ser. No. 715,403
Int. Cl. G01r 23/00
U.S. Cl. 324—79  3 Claims

ABSTRACT OF THE DISCLOSURE

A circuit for determining which of two repetitive pulse signals has the highest frequency comprising a bistable circuit and a gate circuit wherein a pulse is gated from the pulse signal having the highest frequency in response to the occurrence of two consecutive pulses from that pulse signal without the occurrence of an intervening pulse from the other pulse signal.

The invention herein described was made in the course of work under a contract or subcontract thereunder with the Department of Defense.

This invention relates to a frequency comparator circuit, and more particularly to a circuit for determining which of two repetitive signals has the highest frequency.

In many types of electrical systems it is frequently desirable to compare the frequencies of two repretitive signals. One such situation arises in electrical instrumentation applications where it is necessary to compare the frequency of a data signal representing some monitored value with the frequency of a reference signal representing some standard value in order to ascertain whether the monitored value is greater or lesser than the standard value.

Present frequency comparator circuits usually accomplish the required frequency comparison by converting the frequencies of the two repetitive signals into proportional analog voltages and then sensing the difference in the relative levels of the two voltages to determine which of the two repetitive signals has the highest frequency. However, analog frequency comparator circuits are not completely satisfactory since they are highly susceptible to the introduction of serious inaccuracies in both the frequency to analog conversion process and the voltage level sensing operation due to variations in both voltage supplies and component values. In addition, present frequency comparator circuits are generally constructed from components having the undesirable characteristics of relatively high power consumption and rather large size.

Accordingly, it is a principal object of this invention to provide a circuit for directly comparing the frequencies of two repetitive signals by utilizing digital techniques incorporating primarily a bistable circuit and a gate circuit so as to eliminate the inherent inaccuracies of analog techniques. It is another object of this invention to provide a digital frequency comparator circuit including primarily a bistable circuit and a gate circuit which may be constructed from integrated circuit components having the desirable characteristics of low power consumption and small size. It is a further object of this invention to provide a digital circuit including a bistable circuit and a gate circuit for directly comparing the frequencies of two repetitive pulse signals and including another bistable circuit for producing a sustained output signal so as to indicate which of the two repetitive pulse signals has the highest frequency.

In accordance with a preferred embodiment of the invention, a circuit is provided for determining which of two repetitive pulse signals has the highest frequency. The inventive frequency comparator circuit includes two bistable circuits and a gate circuit. One bistable circuit is responsive to the occurrence of pulses from the two repetitive pulse signals to control the operation of the gate circuit so that a pulse is gated from the pulse signal having the highest frequency in response to the occurrence of two consecutive pulses from that pulse signal without the occurrence of an intervening pulse from the other pulse signal. The other bistable circuit converts the transient gated pulse into a constant voltage so as to provide a sustained indication of which of the two pulse signals has the highest frequency.

The invention may be best understood by reference to the following detailed description of a preferred embodiment when considered in conjunction with the accompanying drawing, in which.

Figure 1:
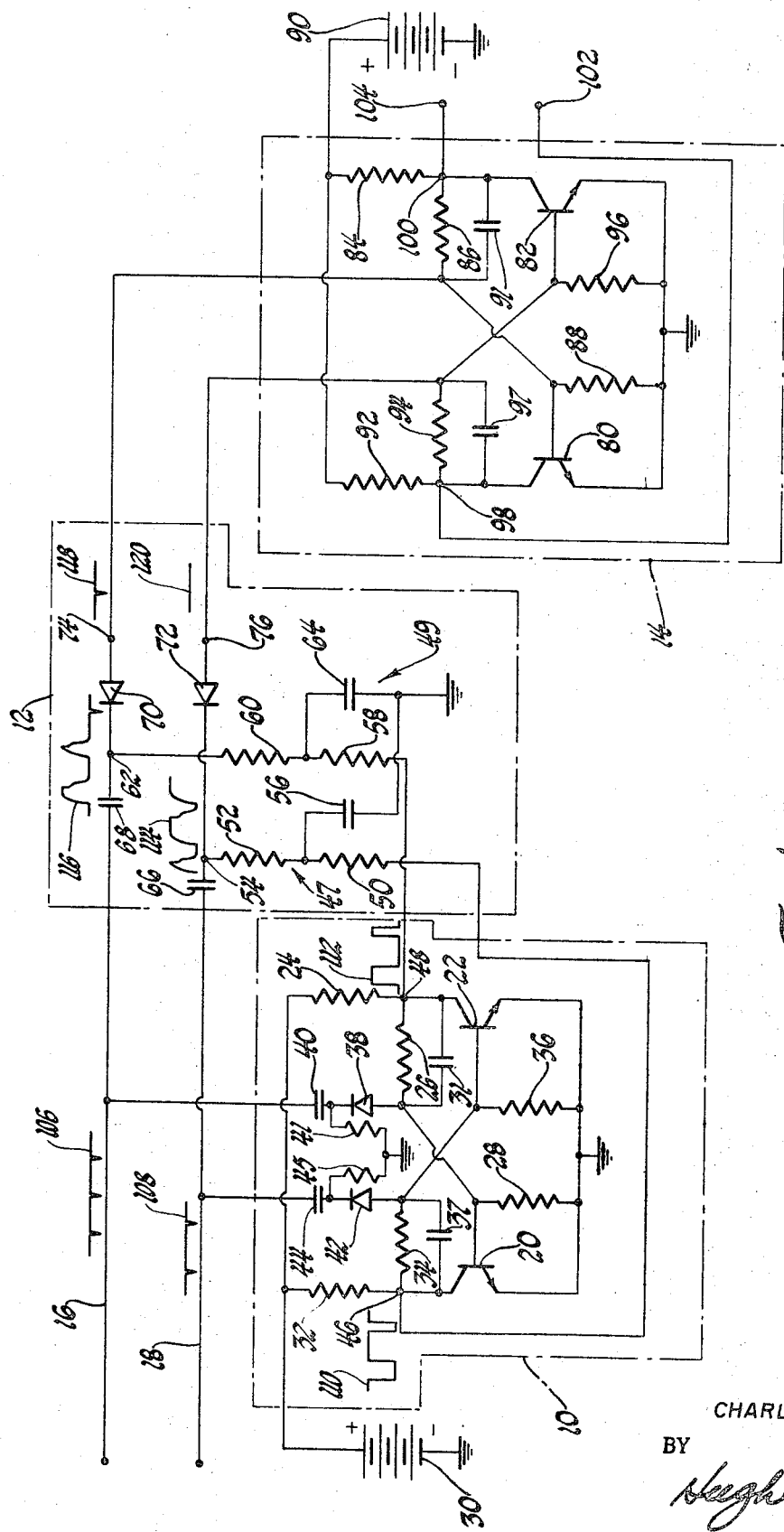
FIG. 1 is a schematic diagram which illustrates a frequency comparator circuit incorporating the principles of the invention.

Referring to FIG. 1, a schematic diagram of a preferred embodiment of the invention is illustrated. The inventive frequency comparator circuit includes a first bistable circuit 10, a gate circuit 12, and a second bistable circuit 14. Input terminals 16 and 18 are connected to the first bistable circuit 10 and the gate circuit 12.

The first bistable circuit 10 is provided by a first bistable multivibrator or flip-flop including a first transistor 20 and a second transistor 22, each transistor having an emitter, a base, and a collector electrode. A voltage divider network is provided by the combination of series coupled resistors 24, 26 and 28 connected between the positive side of a suitable voltage source 30 and ground. A commutating capacitor 31 is connected across the resistor 26. Another voltage divider network is provided by the combination of series coupled resistors 32, 34 and 36 also connected between the positive side of the voltage source 30 and ground. A commutating capacitor 37 is connected across the resistor 34. The base of the first transistor 20 is connected from between the resistors 26 and 28 and the capacitor 31 to the input terminal 16 through a steering diode 38 and a coupling capacitor 40. A discharge resistor 41 is connected from between the diode 38 and the capacitor 40 to ground. The base of the second transistor 22 is connected from between the resistors 34 and 36 and the capacitor 37 to the input terminal 18 through a steering diode 42 and a coupling capacitor 44. A discharge resistor 45 is connected from between the diode 42 and the capacitor 44 to ground. The collector of the first transistor 20 is connected to a point 46 between the resistors 32 and 34. The collector of the second transistor 22 is connected to a point 48 between the resistors 24 and 26.

The gate circuit 12 includes a pair of voltage delay networks 47 and 49. The voltage delay network 47 is provided by the combination of series coupled resistors 50 and 52 connected from a point 54 to the point 46, and a capacitor 56 connected from between the resistors 50 and 52 to ground. The voltage delay network 49 is provided by the combination of series coupled resistors 58 and 60 connected from a point 62 to the point 48, and a capacitor 64 connected from between the resistors 58 and 60 to ground. The point 54 is connected to the input terminal 18 through a coupling capacitor 66. The point 62 is connected to input terminal 16 through a coupling capacitor 68. Two unidirectional conducting devices are provided by a pair of negatively poled blocking diodes 70 and 72. The diode 70 is connected between the point 62 and a point 74. The diode 72 is connected between the point 54 and a point 76.

The second bistable circuit 14 is provided by a second bistable multivibrator or flip-flop including a first transistor 80 and a second transistor 82, each transistor having an emitter, a base, and a collector electrode. A voltage divider network is provided by the combination of series coupled resistors 84, 86 and 88 connected between the positive side of a suitable voltage source 90 and ground. A commutating capacitor 91 is connected across the resistor 86. Another voltage divider network is provided by the combination of series coupled resistors 92, 94 and 96 also connected between the positive side of the voltage source 90 and ground. A commutating capacitor 97 is connected across the resistor 94. The base of the first transistor 80 is connected from between the resistors 86 and 88 and the capacitor 91 to the point 74. The base of the second transistor 82 is connected from between the resistors 94 and 96 and the capacitor 97 to the point 76. The collector of the first transistor 80 is connected to a point 98 between the resistors 92 and 94. The collector of the second transistor 82 is connected to a point 100 between the resistors 84 and 86. An output terminal 102 is connected to the point 98 and an output terminal 104 is connected to the point 100.

The first and second transistors 20 and 22 of the first bistable circuit 10 and the first and second transistors 80 and 82 of the second bistable circuit 14 are illustrated as being of the NPN type. However, these transistors may also be of the PNP type in which case the circuitry is the same except that the polarity of all diodes, voltage sources, and waveforms are reversed from those shown.

Figure 2:
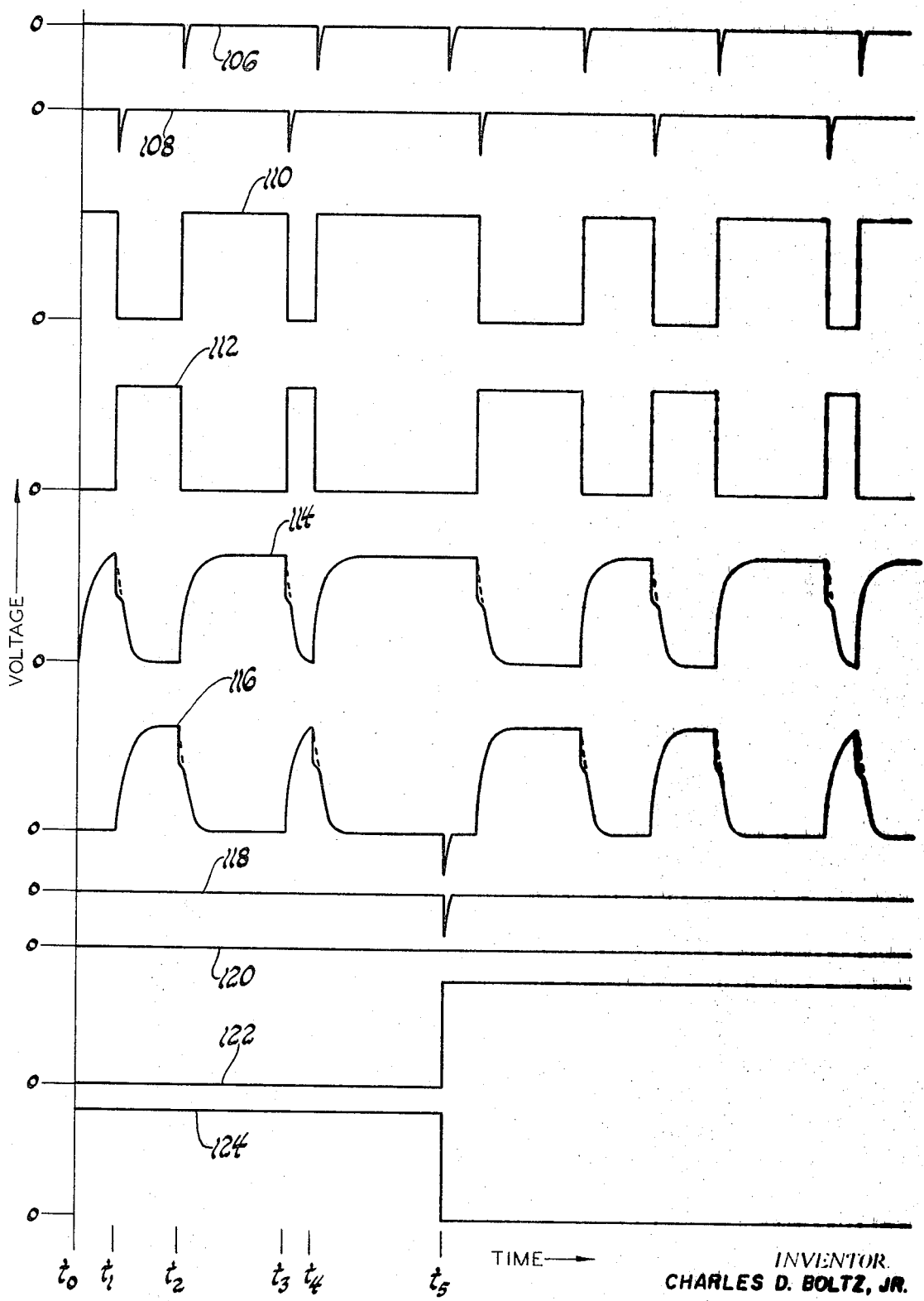
FIG. 2 is a graph which illustrates typical waveforms useful in explaining the operation of the inventive frequency comparator circuit disclosed in FIG. 1.

The operation of the preferred embodiment of the invention disclosed in FIG. 1 may be best demonstrated by referring to FIG. 2 which is a graph illustrating a series of typical waveforms comprising a plot of voltage versus time at various points in the inventive circuit. The first pulse signal received at the input terminal 16 is represented by the waveform 106 and the second pulse signal received at the input terminal 18 is represented by the waveform 108. Preferably, the first and second pulse signals 106 nad 108 are in the form of negative trigger pulses which may be readily provided by a conventional pulse forming circuit (not shown). The frequencies of the first and second pulse signals 106 and 108 will correspond to the frequencies of any two repetitive signals applied as inputs to the pulse forming circuit. For example, the repetitive signal corresponding to the first pulse signal 106 may be a data signal having a frequency which represents some monitored value, and the repetitive signal corresponding to the second pulse signal 108 may be a reference signal having a frequency which represents some standard value. Thus, a comparison of the frequencies of the first and second pulse signals 106 and 108 will indicate whether the monitored value is greater or lesser than the standard value. As can be observed, the first pulse signal 106 has a higher frequency than the second pulse signal 108.

A first control signal which appears at the point 46 in the first bistable circuit 10 is represented by the waveform 110 and a second control signal which appears at the point 48 in the first bistable circuit 10 is represented by the waveform 112. The waveform 114 represents the resultant voltage present at the point 54 in the gate circuit 12 and the waveform 116 represents the resultant voltage present at the point 62 in the gate circuit 12. A first gate signal which appears at the point 74 in the gate circuit 12 is represented by the waveform 118 and a second gate signal which appears at the point 76 in the gate circuit 12 is repreesnted by the waveform 120. A first output signal provided at the point 98 in the second bistable circuit 14 is represented by the waveform 122 and a second output signal provided at the point 100 in the second bistable circuit 14 is represented by the waveform 124.

In operation, assume that at a time $t_0$ the voltage source 30 is applied to the first bistable circuit 10 and the voltage source 90 is applied to the second bistable circuit 14. Initially, the first and second transistors 20 and 22 of the first bistable circuit 10 conduct almost equally and the first and second transistors 80 and 82 of the second bistable circuit 14 conduct almost equally. However, some unbalance is present due to slight differences in the transistor characteristics and the resistor values, and one transistor will conduct more than the other. A regenerative switching effect then takes place which causes the transistor initially conducting more than the other to fully turn on and causes the other transistor to fully turn off.

Assume that after the application of the voltage source 30 to the first bistable circuit 10 at the time $t_0$ the first transistor 20 is turned off and the second transistor 22 is turned on. In this state, the second transistor 22 is essentially a short circuit which shunts the resistors 26 and 28 thereby minimizing the bias voltage on the base of the first transistor 20 so that the first transistor 20 remains turned off. The bias voltage on the base of the second transistor 22 is determined by the voltage divider network formed by the resistors 32, 34 and 36 so that the second transistor 22 remains turned on. Since the first transistor 20 is turned off, it is essentially an open circuit so that the first control signal 110 produced at the point 46 is a positive voltage which is determined by the voltage divider network formed by the resistors 32, 34 and 36. This positive voltage is coupled to the gate circuit 12 at the point 54 by the voltage delay network 47 formed by the resistors 50 and 52 and the capacitor 56. The rise of the positive voltage of the first control signal 110 at the point 54 is delayed as indicated by the waveform 114 as the capacitor 56 initially charges through the resistor 50. Since the second transistor 22 is essentially a short circuit, the second control signal 112 produced at the point 48 is substantially zero.

Assume that after the application of the voltage source 90 to the second bistable circuit 14 at the time $t_0$ the first transistor 80 is turned on and the second transistor 82 is turned off. In this state, the first transistor 80 is essentially a short circuit which shunts the resistors 94 and 96 thereby minimizing the bias voltage on the base of the second transistor 82 so that the second transistor 82 remains turned off. The bias voltage on the base of the first transistor 80 is determined by the voltage divider network formed by the resistors 84, 86 and 88 so that the first transistor 80 remains turned on. Since the second transistor 82 is turned off, it is essentially an open circuit so that the second output signal 124 produced at the point 100 is a positive voltage which is determined by the voltage divider network formed by the resistors 84, 86 and 88. This positive voltage is coupled to the output terminal 104. Since the first transistor 80 is essentially a short circuit, the first output signal 122 produced at the point 98 is substantially zero.

At a time $t_1$ a negative pulse occurs from the second pulse signal 108 and is coupled from the input terminal 18 to the first bistable circuit 10 at the base of the second transistor 22 through the capacitor 44 and the diode 42 thereby lowering the bias voltage on the base of the second transistor 22 so that the second transistor 22 is turned off. As the second transistor 22 turns off, it removes the short circuit from across the resistors 26 and 28 thereby raising the bias voltage on the base of the first transistor 20 so that the first transistor 20 is turned on. Since the first transistor 20 is turned on, it is essentially a short circuit which shunts the resistors 34 and 36 thereby minimizing the bias voltage on the base of the second transistor 22 so that the second transistor 22 remains turned off. The bias voltage on the base of the first transistor 20 is determined by the voltage divider network formed by the resistors 24, 26 and 28 so that the first transistor 20 remains turned on. Since the second transistor 22 is turned off, it is essentially an open circuit so that the second control signal 112 produced at the point 48 is a positive voltage which is determined by the voltage divider network formed by the resistors 24, 26 and 28. This positive voltage is coupled to the gate circuit 12 at the point 62 by the voltage delay network 49 formed by the resistors 58 and 60 and the capacitor 64. The rise of the positive voltage of the second control signal 112 at the point 62 is delayed as indicated by the waveform 116 as the capacitor 64 initially charges through the resistor 58. Since the first transistor 20 is essentially a short circuit, the first control signal 110 produced at the point 46 falls from a positive voltage to substantially zero. However, the fall of the positive voltage of the first control signal 110 at the point 54 in the gate circuit 12 is delayed as indicated by the dashed line of the waveform 114 as the capacitor 56 discharges through the resistor 50 and the first transistor 20 to ground.

At the time $t_1$ the negative pulse from the second pulse signal 108 is also simultaneously coupled from the input terminal 18 to the gate circuit 12 at the point 54 by the capacitor 66. At the point 54 the decaying positive voltage of the first control signal 110 is applied as a bias by the voltage delay network 47 to shift the voltage level of the negative pulse from the second pulse signal 108. The magnitude of this positive bias voltage is sufficient to reverse the polarity of the negative pulse so that the resultant voltage at the point 54 is positive as indicated by the waveform 114. This positive resultant voltage 114 containing the shifted negative pulse is blocked by the negatively poled diode 72 so that the second gate signal 120 provided at the point 76 is substantially zero and the state of the second bistable circuit 14 remains unchanged.

At a time $t_2$ a negative pulse occurs from the first pulse signal 106 and is coupled from the input terminal 16 to the first bistable circuit 10 at the base of the first transistor 20 by the capacitor 40 and the diode 38 so that the first transistor 20 is turned off and the second transistor 22 is turned on. The first control signal 110 produced at the point 46 is a positive voltage which is coupled to the gate circuit 12 at the point 54 by the voltage delay network 47. The second control signal 112 produced at the point 48 falls from a positive voltage to substantially zero. However, the fall of the positive voltage of the second control signal 112 at the point 62 in the gate circuit 12 is delayed as indicated by the dashed line of the waveform 116 as the capacitor 64 discharges through the resistor 58 and the second transistor 22 to ground.

At the time $t_2$ the negative pulse from the first pulse signal 106 is also simultaneously coupled from the input terminal 16 to the gate circuit 12 at the point 62 by the capacitor 68. At the point 62 the decaying positive voltage of the second control signal 112 is applied as a bias by the voltage delay network 49 to shift the voltage level of the negative pulse from the first pulse signal 106. The magnitude of this positive bias voltage is sufficient to reverse the polarity of the negative pulse so that the resultant voltage at the point 62 is positive as indicated by the waveform 116. This positive resultant voltage 116 containing the negative pulse is blocked by the negatively poled diode 70 so that the first gate signal 118 provided at the point 74 is substantially zero and the state of the second bistable circuit 14 again remains unchanged.

At a time $t_3$ a negative pulse occurs from the second pulse signal 108 and the operation of the inventive circuit is identical to that at the time $t_1$. At a time $t_4$ a negative pulse occurs from the first pulse signal 106 and the operation of the inventive circuit is identical to that at the time $t_2$. However, at a time $t_5$ another negative pulse occurs from the first pulse signal 106 and is simultaneously coupled to the first bistable circuit 10 at the base of the first transistor 20 and to the gate circuit 12 at the point 62. Since the first transistor 20 has already been turned off by the immediately preceding pulse from the first pulse signal 106 at the time $t_4$, the pulse from the first pulse signal 106 at the time $t_5$ has no effect on the state of the first bistable circuit 10, and the first transistor 20 remains turned off and the second transistor 22 remains turned on. At the point 62 in the gate circuit 12, the positive voltage of the second control signal 112 produced by the pulse from the second pulse signal 108 at the time $t_3$ has already decayed to zero as a result of the pulse from the first pulse signal 106 at the time $t_4$ as indicated by the waveform 116. Since a pulse has not occurred from the second pulse signal 108 after the occurrence of the pulse from the first pulse signal 106 at the time $t_4$, there is no positive bias voltage present at the point 62 to shift the voltage level of the negative pulse from the first pulse signal 106 at the time $t_5$. Consequently, the polarity of the negative pulse at the time $t_5$ is not reversed and the resultant voltage at the point 62 is a negative pulse as indicated by the waveform 116. This negative pulse from the first pulse signal 106 is passed by the negatively poled diode 70 to the point 74 where it appears as a negative pulse in the first gate signal 118.

It will be remembered that in the second bistable circuit 14 the first transistor 80 is turned on and the second transistor 82 is turned off. However, at the time $t_5$ the negative pulse in the first gate signal 118 at the point 74 is coupled to the second bistable circuit 14 at the base of the first transistor 80 thereby lowering the bias voltage on the base of the first transistor 80 so that the first transistor 80 is turned off. As the first transistor 80 turns off, it removes the short circuit from across the resistors 94 and 96 thereby raising the bias voltage on the base of the second transistor 82 so that the second transistor 82 is turned on. Since the second transistor 82 is turned on, it is essentially a short circuit which shunts the resistors 86 and 88 thereby minimizing the bias voltage on the base of the first transistor 80 so that the first transistor 80 remains turned off. The bias voltage on the base of the second transistor 82 is determined by the voltage divider network formed by the resistors 92, 94 and 96 so that the second transistor 82 remains turned on. Since the first transistor 80 is turned off, it is essentially an open circuit so that the first output signal 122 produced at the point 98 is a positive voltage which is determined by the voltage divider network formed by the resistors 92, 94 and 96. This positive voltage is coupled to the output terminal 102. Since the second transistor 82 is essentially a short circuit, the second output signal 124 produced at the point 100 falls abruptly from a positive voltage to substantially zero.

Thus, a pulse is present in the first gate signal 118 only in response to the occurrence of two consecutive pulses from the first pulse signal 106 without the occurrence of an intervening pulse from the second pulse signal 108. This condition can only take place where the first pulse signal 106 has a higher frequency than the second pulse signal 108. Therefore, the presence of a pulse in the first gate signal 118 indicates that the first pulse signal 106 has a higher frequency than the second pulse signal 108.

As additional pulses occur from the first and second pulse signals 106 and 108, the first bistable circuit 10 and the gate circuit 12 continue to operate as previously described. A pulse from the first pulse signal 106 is provided in the first gate signal 118 every time two consecutive pulses occur from the first pulse signal 106 without the occurrence of an intervening pulse from the second pulse signal 108. However, the state of the second bistable circuit 14 remains unchanged since it has already switched states in response to the presence of the pulse in the first gate signal 118 at the time $t_5$.

It will be readily apparent that through an analysis similar to that previously made, it can be shown that where the second pulse signal 108 has a higher frequency than the first pulse signal 106, a pulse from the second pulse signal 108 is provided in the second gate signal 120 in response to the occurrence of two consecutive pulses from the second pulse signal 108 without the occurrence of an intervening pulse from the first pulse signal 106. Therefore, the presence of a pulse in the second gate signal 120 indicates that the second pulse signal 108 has a higher frequency than the first pulse signal 106.

It is to be noted that the second bistable circuit 14 is not required in order that the inventive frequency comparator circuit function properly. The presence or absence of a pulse in the first and second gate signals 118 and 120 is sufficient to indicate which of the first and second pulse signals 106 and 108 has the highest frequency. However, the second bistable circuit 14 converts the transient negative pulses of the first and second gate signals 118 and 120 into sustained positive voltages in the first and second output signals 122 and 124, respectively, which are more readily useable for performing various control functions such as the operation of an electromechanical relay or some other voltage responsive device. Thus, the presence of a voltage in the first output signal 122 indicates that the first pulse signal 106 has the highest frequency and the presence of a voltage in the second output signal 124 indicates that the second pulse signal 108 has the highest frequency.

In summary, the first and second pulse signals 106 and 108 are coupled to the first bistable circuit 10 which produces the first and second control signals 110 and 112. The first bistable circuit 10 is responsive to the occurrence of a pulse from the first pulse signal 106 to provide a voltage in the first control signal 110 and is responsive to the occurrence of a pulse from the second pulse signal 108 to provide a voltage in the second control signal 112.

The first and second pulse signals 106 and 108 and the first and second control signals 110 and 112 are coupled to the gate circuit 12 which produces the first and second gate signals 118 and 120. The gate circuit 12 is responsive to the absence of a voltage in the second control signal 112 immediately prior to the occurrence of a pulse from the first pulse signal 106 to provide a pulse in the first gate signal 118. This condition can only take place where the first pulse signal 106 has a higher frequency than the second pulse signal 108. The gate circuit 12 is also responsive to the absence of a voltage in the first control signal 110 immediately prior to the occurrence of a pulse from the second pulse signal 108 to provide a pulse in the second gate signal 120. This condition can only take place where the second pulse signal 108 has a higher frequency than the first pulse signal 106.

The first and second gate signals 118 and 120 are coupled to the second bistable circuit 14 which produces the first and second output signals 122 and 124. The second bistable circuit is responsive to the presence of a pulse in the first gate signal 118 to provide a voltage in the first output signal 122 and is responsive to the presence of a pulse in the second gate signal 120 to provide a voltage in the second output signal 124.

As will be appreciated, the operation of the gate circuit 12 may be considered from various other aspects. In one other aspect, the voltage delay network 49 shifts the voltage level of a pulse from the first pulse signal 106 in response to the presence of a voltage in the second control signal 112 immediately prior to the occurrence of the pulse from the first pulse signal 106 and the voltage delay network 47 shifts the voltage level of a pulse from the second pulse signal 108 in response to the presence of a voltage in the first control signal 110 immediately prior to the occurrence of the pulse from the second pulse signal 108. The unidirectional conducting diode 70 passes a pulse from the first signal 106 to provide a pulse in the first gate signal 118 only when the voltage level of the pulse from the first pulse signal 106 is not shifted and the unidirectional conducting diode 72 passes a pulse from the second pulse signal 108 to provide a pulse in the second gate signal 120 only when the voltage level of the pulse from the second pulse signal 108 is not shifted.

In another aspect, the voltage delay network 49 applies the positive voltage of the second control signal 112 as a bias to shift the voltage level of the next pulse to occur from the first pulse signal 106 so as to reverse the polarity of the pulse and the voltage delay network 47 applies the positive voltage of the first control signal 112 as a bias to shift the voltage level of the next pulse to occur from the second pulse signal 108 so as to reverse the polarity of the pulse. The unidirectional conducting diode 70 is voltage level and polarity responsive so as to pass a pulse from the first pulse signal 106 to provide a pulse in the first gate signal 118 only when the voltage level of the pulse is not shifted and the polarity is not reversed, and the unidirectional conducting diode 72 is voltage level and polarity responsive so as to pass a pulse from the second pulse signal 108 to provide a pulse in the second gate signal 120 only when the voltage level of the pulse is not shifted and the polarity is not reversed.

In an actual circuit constructed in accordance with the inventive frequency comparator circuit illustrated in FIG. 1, the following components were employed:

Transistors 20, 22, 80 and 82 _____ 2N730
Diodes 38, 42, 70 and 72 _____ 1N457

| | Volts |
|---|---|
| Voltage sources 30 and 90 | 18 |
| Pulse signals 106 and 108 | −4 |

| | Ohms |
|---|---|
| Resistors 24, 32, 84 and 92 | 5600 |
| Resistors 26, 34, 86 and 94 | 7500 |
| Resistors 28, 36, 88 and 96 | 2000 |
| Resistors 50, 52, 58 and 60 | 3300 |
| Resistors 41 and 45 | 6800 |

| | Micromicrofarads |
|---|---|
| Capacitors 40, 44, 56, 64, 66 and 68 | 1000 |
| Capacitors 31, 37, 91 and 97 | 680 |

It will be noted that in describing the operation of the illustrated frequency comparator circuit, the function of the commutating capacitors 31, 37, 91 and 97 has been disregarded since they do not materially affect the steady state operation of the inventive circuit. The capacitors 31 and 37 accelerate the regenerative switching effect between the first and second transistors 20 and 22 of the first bistable circuit 10 and the capacitors 91 and 97 accelerate the regenerative switching effect between the first and second transistors 80 and 82 of the second bistable circuit 14. This acceleration is accomplished because at the moment of switching, the sudden change in voltage at the collector of a transistor is initially transmitted at full potential to the base of the opposite transistor by the associated commutating capacitor. Thus, at the moment of switching the capacitors 31 and 37 effectively shunt the corresponding resistors 26 and 34 in the first bistable circuit 10 and the capacitors 91 and 97 effectively shunt the corresponding resistors 86 and 94 in the second bistable circuit 14.

It is a principal advantage of the inventive frequency comparator circuit that it avoids the inherent voltage drift of analog frequency comparator circuits and that it may be readily constructed from integrated circuits having low power consumption and small size.

It is to be understood that the preferred embodiment of the invention described herein is merely illustrative and that various alterations and modifications may be made without departing from the spirit and scope of the invention. The precise arrangement of the first flip-flop circuit 10, the gate circuit 12, and the second flip-flop circuit 14 may be altered considerably by substituting different components or adding other components provided that the function performed by each of the circuits remains as previously described. The invention is to be limited only by the following claims.

I claim:

1. A circuit for comparing the frequencies of first and second repetitive pulse siganls, comprising: bistable multivibrator means coupled to the first and second pulse signals for producing first and second control signals, the bistable multivibrator means including a first transistor responsive to the occurrence of a pulse from the first pulse signal to provide a bias voltage in the first control signal and including a second transistor responsive to the occurrence of a pulse from the second pulse signal to provide a bias voltage in the second control signal; and gate means coupled to the first and second pulse signals and to the first and second control signals for producing first and second gate signals, the gate means including a first voltage decay delay network for applying the bias voltage in the first control signal to shift the voltage level of the next pulse to occur from the second pulse signal and a second voltage decay delay network for applying the bias voltage in the second pulse signal to shift the voltage level of the next pulse to occur from the first pulse signal, the gate means further including a first voltage level responsive device for passing a pulse from the first pulse signal to provide a pulse in the first gate siginal only when the voltage level of the pulse from the first pulse signal is not shifted and a second voltage level responsive device for passing a pulse from the second pulse signal to provide a pulse in the second gate signal only when the voltage level of the pulse from the second pulse signal is not shifted; whereby the presence of a pulse in the first gate signal indicates that the first pulse signal has the highest frequency and the presence of a pulse in the second gate signal indicates that the second pulse signal has the highest frequency.

2. A circuit for comparing the frequencies of first and second repetitive pulse signals, comprising: bistable multivibrator means coupled to the first and second pulse signals for producing first and second control signals, the bistable multivibrator means including a first transistor responsive to the occurrence of a pulse from the first pulse signal to provide a bias voltage in the first control signal having a polarity opposite to the polarity of the pulses in the second pulse signal and including a second transistor responsive to the occurrence of a pulse from the second pulse signal to provide a bias voltage in the second control signal having a polarity opposite to the polarity of the pulses in the first pulse signal; and gate means coupled to the first and second pulse signals and to the first and second control signals for producing first and second gate signals, the gate means including a first resistor-capacitor voltage decay delay network for applying the bias voltage in the first control signal to shift the voltage level of the next pulse to occur from the seond pulse signal so as to reverse the polarity of the pulse and a second resistor-capacitor voltage decay delay network for applying the bias voltage in the second control signal to shift the voltage level of the next pulse to occur from the first pulse signal so as to reverse the polarity of the pulse, the gate means further including a first unidirectional conducting device responsive to voltage polarity for passing a pulse from the first pulse signal to provide a pulse in the first gate signal only when the polarity of the pulse from the first pulse signal is not reversed and a second unidirectional conducting device for passing a pulse from the second pulse signal to provide a pulse in the second gate signal only when the polarity of the pulse in the second pulse signal is not reversed; whereby the presence of a pulse in the first gate signal indicates that the first pulse signal has the highest frequency and the presence of a pulse in the second gate signal indicates that the second pulse signal has the highest frequency.

3. A circuit for comparing the frequencies of first and second repetitive pulse signals, comprising: first bistable multivibrator means coupled to the first and second pulse signals for producing first and second control signals, the first bistable multivibrator means including a first transistor responsive to the occurrence of a pulse from the first pulse signal to provide a bias voltage in the first control signal having a polarity opposite to the polarity of the pulses in the second pulse signal and including a second transistor responsive to the occurrence of a pulse from the second pulse signal to provide a bias voltage in the second control signal having a polarity opposite to the polarity of the pulses in the first pulse signal; and gate means coupled to the first and second pulse signals and to the first and second control signals for producing first and second gate signals, the gate means including a first resistor-capacitor voltage decay delay network for applying the bias voltage in the first control signal to shift the voltage level of the next pulse to occur from the second pulse signal so as to reverse the polarity of the pulse and a second resistor-capacitor voltage decay delay network for applying the bias voltage in the second control signal to shift the voltage level of the next pulse to occur from the first pulse signal so as to reverse the polarity of the pulse, the gate means further including a first unidirectional conducting diode responsive to voltage polarity for passing a pulse from the first pulse signal to provide a pulse in the first gate signal only when the polarity of the pulse from the first pulse signal is not reversed and a second unidirectional conducting diode for passing a pulse from the second pulse signal to provide a pulse in the second gate signal only when the polarity of the pulse from the second pulse signal is not reversed; and second bistable multivibrator means coupled to the first and second gate signals for producing first and second output signals, the second bistable multivibrator means including a third transistor responsive to the presence of a pulse in the first gate signal to provide an indicating voltage in the first output signal and including a fourth transistor responsive to the presence of a pulse in the second gate signal to provide an indicating voltage in the second output signal; whereby the presence of an indicating voltage in the first output signal indicates that the first pulse signal has the highest frequency and the presence of an indicating voltage in the second output signal indicates that the second pulse signal has the highest frequency.

References Cited

UNITED STATES PATENTS 2,795,695   6/1957   Raynsford.

ALFRED E. SMITH, Primary Examiner

U.S. Cl. X.R.

307—233; 324—82